(No Model.)  3 Sheets—Sheet 1.
W. H. BERRIGAN, Jr.
DETECTOR FOR RAILWAY SWITCHES.
No. 566,887.  Patented Sept. 1, 1896.
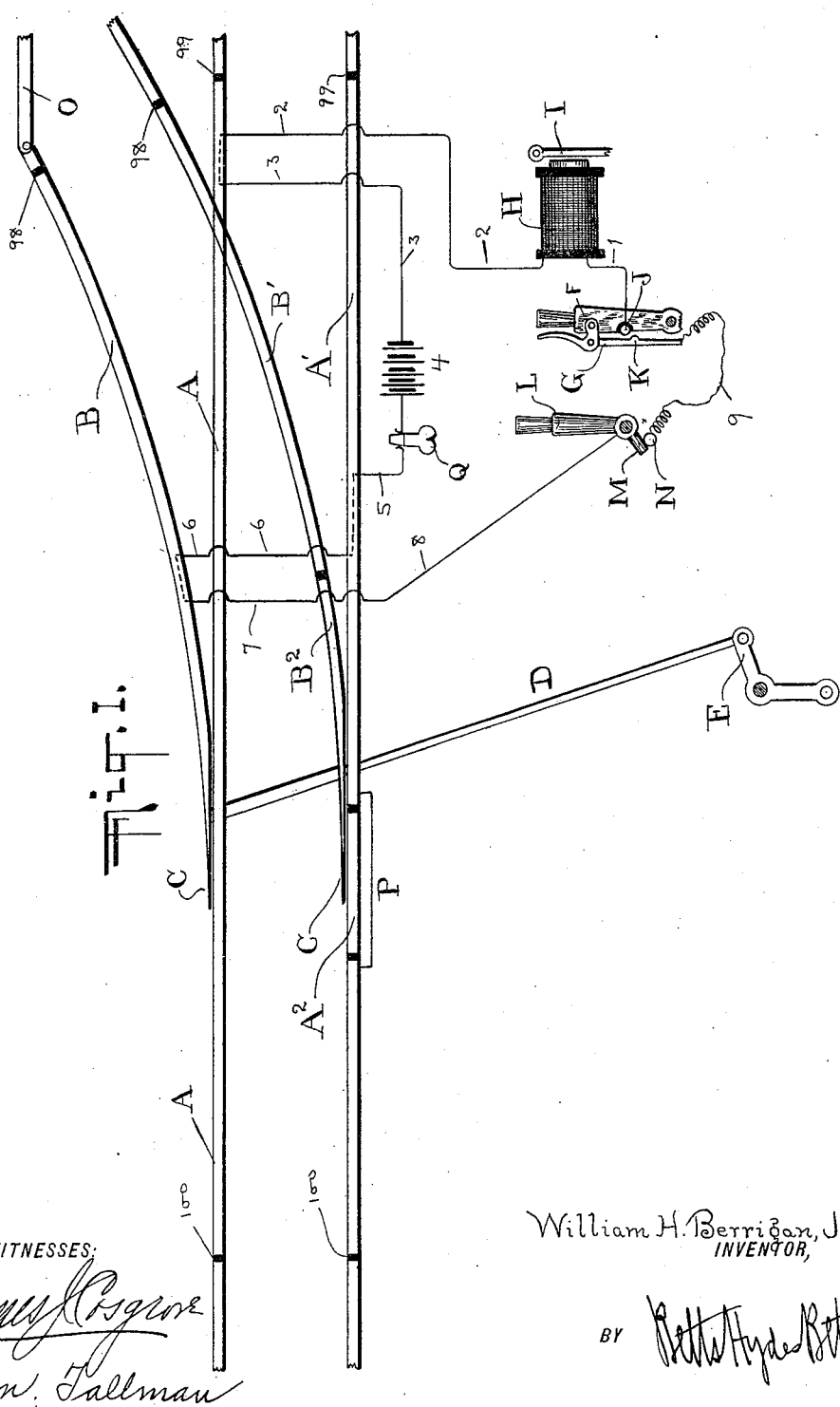

(No Model.) 3 Sheets—Sheet 2.
W. H. BERRIGAN, Jr.
DETECTOR FOR RAILWAY SWITCHES.
No. 566,887. Patented Sept. 1, 1896.
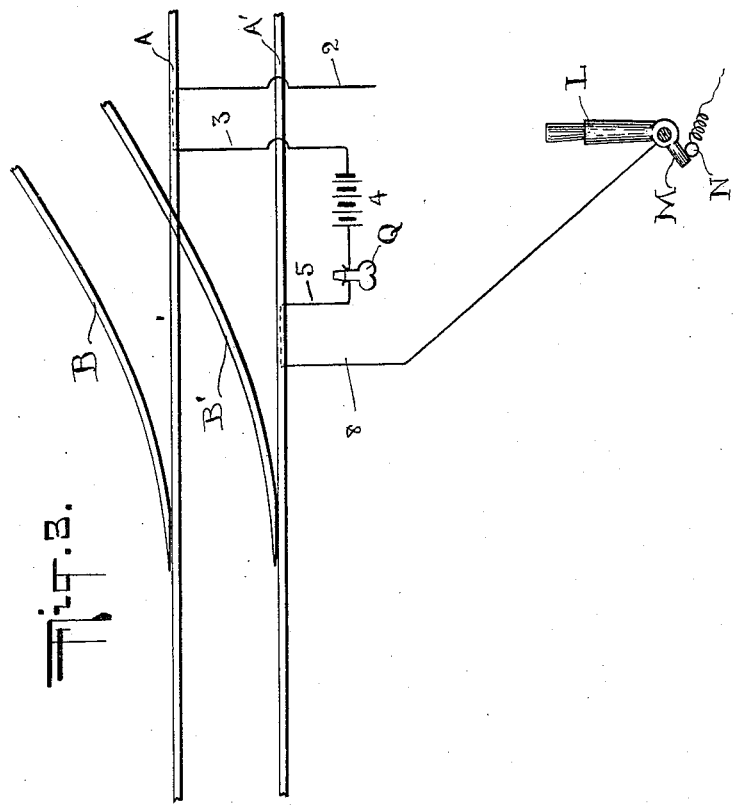
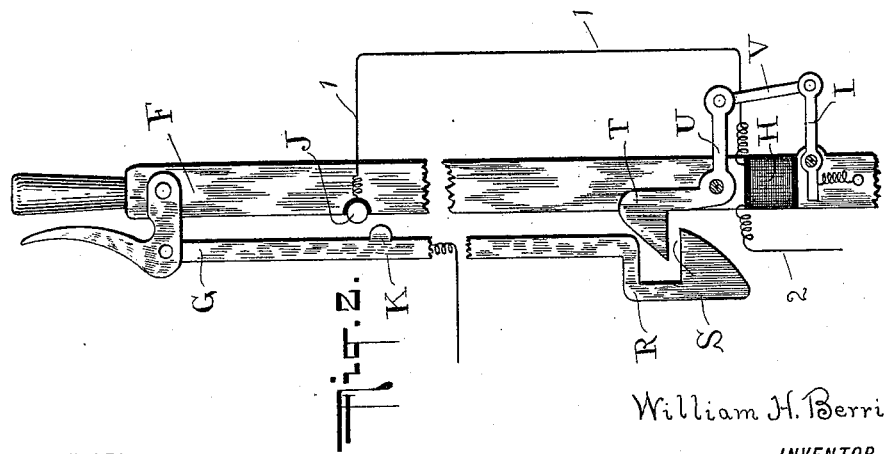
WITNESSES:
William H. Berrigan, Jr.,
INVENTOR,
BY
ATTORNEYS.

(No Model.) 3 Sheets—Sheet 3.
W. H. BERRIGAN, Jr.
DETECTOR FOR RAILWAY SWITCHES.
No. 566,887. Patented Sept. 1, 1896.
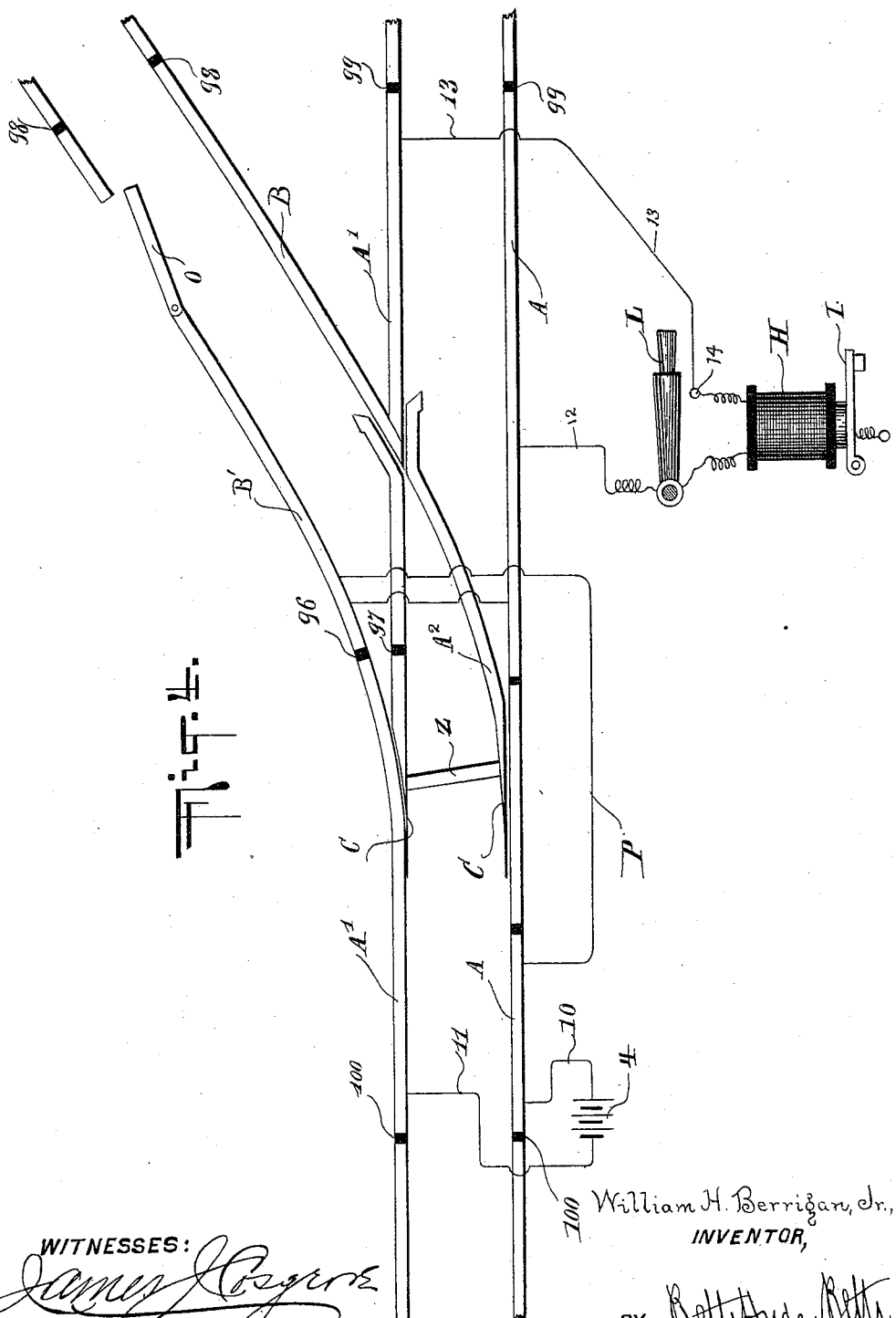

UNITED STATES PATENT OFFICE.

WILLIAM H. BERRIGAN, JR., OF BROOKLYN, NEW YORK.

DETECTOR FOR RAILWAY-SWITCHES.

SPECIFICATION forming part of Letters Patent No. 566,887, dated September 1, 1896.

Application filed April 26, 1895. Serial No. 547,224. (No model.)

*To all whom it may concern:*

Be it known that I, WILLIAM HENRY BERRIGAN, Jr., a citizen of the United States, and a resident of the city of Brooklyn, in the county of Kings and State of New York, have invented certain new and useful Improvements in Detectors for Railway-Switches, of which the following is a full, true, and accurate description, reference being had to the accompanying drawings.

The objects of my invention are, first, to provide the switching mechanisms of railways with efficient and economical electrical substitutes for the mechanical devices now employed, commonly called "detector-bars," used to prevent the movements of a railway-switch when there is a car or a portion of a car on a determined section of the railroad, either the main line or the siding; second, to so arrange the mechanical and electrical connections that the unlocking of the switching mechanism may be easily and quickly effected by the workman when proper to be done, employing cheap and positive means for such work; third, to so correlate the circuit, which includes the unlocking means, with a circuit to be established by a car or a portion of a car on a determined section of the railway that the unlocking-circuit will be rendered inoperative; fourth, to so correlate the unlocking-circuit and the circuit established by the car that the wiring of the last-named circuit will be a portion of the unlocking-circuit, whereby a break in the circuit established by the car will also be a break in the unlocking-circuit, making it impossible to unlock the switch mechanism when any portion of the apparatus is out of order; fifth, to provide a switch with means that will prevent its dishonest manipulation, so as to make "flying-switches" an impossibility; sixth, and my improvement is designed to accomplish other beneficial results hereinafter described.

Referring to the accompanying drawings, Figure 1 represents a system embodying my invention. Fig. 2 represents a desirable form of lever, latch, and lock. Fig. 3 represents my invention applied to the main-line rails only. Fig. 4 represents the use of my invention with a closed circuit.

A A' are the rails of the north-bound track, and B B' are the rails of a siding or a branch track. For clearness the rails of the south-bound track are omitted from the drawings. The rails B B' are provided with the movable switch-points C C, which may be thrown so as to open or close the switch by the ordinary mechanism, as, for instance, piping from a tower to a bell-crank E, at which point piping D, for operating the switch-points, may be connected. Many such forms being well known to persons skilled in the making and use of switches, I have not deemed it necessary to show a complete switch mechanism in the drawings.

Heretofore it has been common to fasten detector-bar clips to the rails, these clips sustaining a plurality of oscillated arms, all such arms being connected to a long metal bar, the bar being also mechanically connected to a lever deriving motion from the tower or switch-stand, the movement of the detector-bar being up and down while moving back and forth. The movement of the detector-bar has sometimes also controlled the movement and locking of the switch mechanism.

By my improvement I dispense entirely with detector-bars and their clips, levers, piping, rollers, &c., and throw the switch directly from the tower or switch-stand, and I provide a locking mechanism for the switch mechanism which may be actuated when a circuit is completed by the workmen at the switch-stand or in the tower, and I also provide other electrical means which may be affected upon the completion of a circuit by the presence of one or more cars on a determined section of the road, whereby the circuit which includes the unlocking means is rendered inoperative.

If it is desired to throw the switch, I grasp the handle of the lever F, Fig. 2, and lift its latch G. In doing this I close an electrical circuit, as hereinafter described. Included in this circuit is a wire 1, the coil of a magnet H, wire 2, wire 3, battery 4, wire 5, wire 6, wire 7, wire 8, wire 9, contact K on the latch-rod, and contact J on the lever-bar. Now, when the latch is lifted and the circuit closed, the current flowing around the magnet-core causes such core to attract an armature I, and this controls an unlocking means, whereby the switching mechanism is released, so that it may be thrown in either direction to open or close the switch; but this can only be done if all the cars or all the wheels of the first or last car are outside of the limits of the detector-section, that is to say, in order to throw the switch in either direction no car-wheels must lie between the insulated points 99 99 and 100 100 of the main line or between the insulated points 98 98 of the siding and points 100 100 of the main line, these being the limits of detection, corresponding to the length of the mechanical detector-bar, outside of which all car-wheels must lie in order to permit a switch to be thrown. If, however, a pair of car-wheels are within these limits, it will then be impossible to throw the switch in either direction for the following reason: If the car is on the main line, the current will flow from battery 4 to rail A, thence to the car-wheel on that rail, thence through axle to the other wheel, along rail A' to wire 5, and back to battery, whereby the current from the battery is shunted into the track-circuit so formed, and the circuit which controls the energizing of the magnet 8, even if it should be closed, will not receive enough current to cause an attraction of the armature I, and the lever F cannot be unlocked. On the other hand, if the pair of car-wheels are on the siding and within the limits the current from the battery will flow over wire 3 to rail A, to the frog, over rail B', through the wheel which is upon that rail, through the axle and the opposite wheel, over rail B, over wire 6 to rail A', and over wire 5 to battery, whereby, as before, the current is shunted through a track-circuit and the unlocking apparatus rendered inoperative.

In order that the bar which connected the switch-points with each other may not complete a circuit from rail B to rail B', I have insulated the first section B² of the rail B', and to prevent the said connecting-bar from completing a circuit from rail A to rail A', I have insulated a portion A² of the rail A', against which the switch-points lie, from the rest of the rail, and have run a tap-wire P around this insulated section.

Many forms of locking devices may be used with my invention, but the particular form which I illustrate is preferred by me. To a lever F, connected with the switching mechanism, there is pivoted a latch-rod G, the lower end of which is bent at R to form a jaw S. This jaw S is engaged by a hook T, pivoted on the lever-bar and provided with an arm U. This arm is connected by a link V with a pivoted armature I, arranged to be attracted by a magnet H. The coil of the magnet is connected with a wire 2, which leads to the battery, and the wire 1 is connected with one of a pair of contacts, which touch each other when the unlocking-circuit is closed. The contacts in this instance are an insulated plug J, fitted into the lever-bar F, and a knob K, integral with the latch-rod and connected to the battery by a wire 9. When the latch-rod is lifted, the knob K touches plug J and this closes the circuit. When the circuit is closed, the magnet attracts the pivoted armature I, and by means of the link V and arm U draws back the hook T. It will thus be seen that the preliminary movement of the latch-rod disengages the hook and jaw, (only, however, in case no car is within the detector-section,) and the further movement of the latch-rod permits the lever to be thrown. If there is a car on the detector-section, the jaw S will be drawn up until it engages with the hook T; but it can be drawn no farther.

My detector apparatus is also useful in preventing the taking of "flying-switches," which are the cause of great and frequent damage to property and dangerous to life. In the mechanical detector apparatus prior to my invention it has been possible to push an uncoupled car up the siding and then to immediately throw the switch, so as to allow the engine to go along the main track. This has frequently resulted in derailing the engine or the car, in breaking off the switch-points, or in smashing the derail O, which is thrown over to the position shown in the drawings, when the switch-points are open to leave the main line clear, but the said derail is thrown so as to form a part of the siding-rail when the switch-points are set for the cars to travel from the main to siding. The derail and switch-points may move in unison or in any desired order and are preferably thrown by the movement of the same lever, a connection being sometimes provided from the bell-crank to the derail. When the derail is in the position shown, any cars upon the siding (beyond the derail) would be thrown from the tracks and prevented from running down onto the main line, where they might wreck other cars or smash the switch-points. If a car is traveling up the siding and the switch-points are thrown, the advancing car will smash the derail. All of these accidents are prevented by my apparatus, which compels the engineer, after pushing the car up the siding, to back off the detector-section before the switch can be thrown to allow him to go along the main line.

My invention is also advantageous in permitting the "staking out" of cars, as heretofore, without compelling the engine to leave the section.

I may also employ my invention more advantageously by including in the unlocking-circuit a part of the signal-throwing mechanism, arranged and operating in such manner that one or more of the signals, in either or both directions, shall be set at "danger" or "caution" before the unlocking-circuit will be closed; and although there are many ways of doing this I may, when open-circuit connections are employed, combine with the lever L, which throws the movement of a signal, a contact M, which, when the lever has thrown the signal to "danger" or "caution," abuts against a contact N and completes the unlocking-circuit through such contact and the pivot of the signal-lever. By the use of this feature of my invention the attendant throwing the switch is compelled to set the signals at "danger" or "caution" before he can throw the switch in either direction. My apparatus may also include means whereby the attendant may, when desirable, break the track-circuit. Suppose, for instance, that an engine has become "stalled" because of a hot journal, or of a cylinder blowing out, or held under orders, and a part of it lies in the detector-section, it is desirable to prevent the constant closing of the track-circuit while the train is within the section because of the drain upon the battery. In such case the attendant may, for example, break the circuit from rail A' to the battery by pulling out the plug Q.

While I have shown and described the coöperation of lever F and its latch G to close the unlocking-circuit, yet other means may be used to close such circuit, and my invention may be advantageously employed when the switches are thrown from switch-stands.

The construction and arrangement of the various devices and circuits here shown are those preferred by me, but many other constructions and arrangements may be substituted therefor and be within my invention. For instance, instead of using a normally open circuit and connections, as shown in Figs. 1, 2, and 3, I may advantageously use a normally-closed circuit and connections, as shown in Fig. 4 accompanying. In said Fig. 4 a wire 10 connects one pole of a battery 4 with the rail A, and a wire 11 connects the other pole of said battery with rail A'. A conductor 12 connects the rail A with the coil of the electromagnet H, and a conductor 13 connects the rail A' with the said magnet-coil. The tap-wire P around the insulated section of rail A is continued underneath the rails, but not in contact therewith, to the siding-rail B', and returns to rail A. When there is no car on either the main-line or siding detector-sections, the current flows from battery 4, over wire 11, along rail A', over connecting-bar Z, along rail A², along rail A, over wire 13, through coil of magnet, over wire 12, along rail A, over tap-wire to rail B', over the return-wire to P, along rail A, over wire 10 to battery. If a car should come upon the main-line detector-section, the current from battery 4 will be short-circuited, and the current will flow from battery 4, over wire 11, along rail A', along connecting-bar Z, along rail A², along rail A', through wheels and axle of car, along rail A, over the tap-wire to rail B', over return-wire to tap P, along rail A, and over wire 10 to battery; but if the car be at the left hand of the switch-points the current will flow from battery 4, over wire 11, along rail A', through wheels and axle of car, along rail A, and over wire 10 to battery. If the car should come within the detector-section of the siding, the current will flow from the battery along rail A', along rod Z, along rail A², along rail B', through wheels and axle of car to opposite rail, over the tap-wire to rail A, and to battery. Whenever a car comes on the main or siding detector-section, therefore, the magnet H is rendered inoperative and the armature I released. When such armature is released, it may, if desired, directly lock the switching mechanism. In connection with closed-circuit connections it will be noted that the making and breaking of the circuit in order to lock or unlock the switching mechanism is taken away from the employee. When I use closed circuits and connections, I may also advantageously combine therewith means which necessitate the setting of one or more of the signals at "caution" or "danger," as explained in connection with the open-circuit system of Figs. 1, 2, and 3, so that switching may not be done while the signal is "clear." For this purpose I may include the signal-throwing lever L in the wire 12, and I may also include a contact 14 in the conductor 13, so that when the lever sets the signal at "danger" (the position shown in Fig. 4) the current flows through the magnet-coil and unlocks the switching mechanism, but when the lever is thrown back to clear the signal the current is shunted away from the magnet through contact 14 and through the lever. If desired, the connections may be arranged so as to render the system inoperative until the signal has been locked after being set at "danger" or "caution." I desire to call attention to the forms of circuits shown, the advantage of the use of which is that when there is a break in the track-circuit there will also be a break in the unlocking-circuit, so that in case of accidents the switch mechanism will remain locked and cannot be thrown.

What I claim, and desire to secure, is—

1. A track-circuit for railway purposes, including the main rails from a point considerably distant from the points of the switch in one direction to a point considerably distant beyond the frog in the other direction, and including also the siding-rails from the points of the switch to a point considerably distant beyond the frog, portions of the main and siding rails being insulated, in combination with an electromagnet included in said circuit, for controlling switching mechanism, substantially as described.

2. A track-circuit for railway purposes, including the main rails from a point considerably distant from the points of the switch in one direction to a point considerably distant beyond the frog in the other direction, and also including the siding-rails from the points of the switch to a point considerably distant beyond the frog, portions of the main and siding rails being insulated, an electromagnet included in said circuit for controlling switching mechanism, and a signal-setting mechanism arranged and operating to render the electromagnet effective or ineffective, as desired, substantially as described.

3. In a detector for railway-switches, a switching mechanism, an electrical circuit which includes the main rails from a point considerably distant from the points of the switch in one direction to a point considerably distant from the frog in the other direction, and also includes the siding-rails from the points of the switch to a point considerably distant from the frog, portions of the main and siding rails being insulated, and means, controlled by said circuit, for locking or unlocking the switching mechanism, in either position, substantially as and for the purpose described.

4. In a detector for railway-switches, a switching mechanism, an electric circuit which includes the main rails from a point considerably distant from the points of the switch in one direction to a point considerably distant from the frog in the other direction, and also includes the siding-rails from the points of the switch to a point considerably distant beyond the derail, portions of the main and siding rails being insulated, in combination with means, controlled by said circuit, for locking or unlocking the switching mechanism, in either position, substantially as and for the purpose described.

5. In a detector for railway-switches, a switching mechanism, an electrical circuit which includes the main rails from a point considerably distant from the points of the switch in one direction to a point considerably distant from the frog in the other direction, and also includes the siding-rails from the points of the switch to a point considerably distant beyond the frog, portions of the main and siding rails being insulated, and means, controlled by said circuit, for locking or unlocking the switching mechanism, in either position, in combination with a signal-setting mechanism arranged and operating to render the electrically-controlled means effective or ineffective to lock or unlock the switching mechanism, in either position, substantially as and for the purpose described.

6. In a switching mechanism, a manually-controlled device, for releasing the mechanism, a lock for the said mechanism, electrical connections carried by said releasing device, and by the switching mechanism, said electrical connections included in an electric circuit which controls the aforesaid locking means, substantially as described, all arranged and operating so that the circuit is closed through the locking means, and the switching mechanism unlocked by the operation of the releasing device, substantially as described.

7. In a switching mechanism, a lever for moving the switching mechanism, an insulated contact upon the said lever, a latch for said lever, both the insulated contact and the latch forming part of an electric circuit which controls means to lock or unlock the switching mechanism, all arranged and operating to unlock the switching mechanism when the latch is lifted, substantially as described.

In witness whereof I have hereunto signed my name this 24th day of April, 1895.

WILLIAM H. BERRIGAN, Jr.

In presence of—
WM. TALLMAN,
W. S. JONES.